United States Patent [19]
Nelson

[11] 3,713,764
[45] Jan. 30, 1973

[54] APPARATUS FOR REMOVING THE FLASHED WASTE FROM A BLOW MOLDED OBJECT

[75] Inventor: Melvin O. Nelson, Kansas City, Mo.
[73] Assignee: Phillips Petroleum Company
[22] Filed: Sept. 28, 1970
[21] Appl. No.: 76,025

[52] U.S. Cl. .................... 425/302, 264/94, 264/161, 425/387, 425/DIG. 806
[51] Int. Cl. ....................... B29c 17/07, B29c 17/08
[58] Field of Search........264/161, 94, 96, 97, 98, 99; 18/5 BS; 425/326, 387, DIG. 806, 302

[56] References Cited

UNITED STATES PATENTS 3,499,071   3/1970   Hurst............................264/161 UX Primary Examiner—Robert F. White
Assistant Examiner—J. H. Silbausgh
Attorney—Young and Quigg

[57] ABSTRACT

An undercut portion on an extended opposite side of opposing halves of a blow mold engages and imparts a twist to the waste flashed plaque of a blow molded article to remove this plaque from the molded article as the mold is opened.

4 Claims, 5 Drawing Figures

PATENTED JAN 30 1973

INVENTOR.
M. O. NELSON

BY

ATTORNEYS

INVENTOR.
M. O. NELSON
BY Young and Quigg
ATTORNEYS

APPARATUS FOR REMOVING THE FLASHED WASTE FROM A BLOW MOLDED OBJECT

BACKGROUND OF THE INVENTION

This invention relates to an apparatus for blow molding containing means for removal of the waste flashed plaque material.

In one concept of the invention it relates to the removal of the waste flashed plaque from a blow molded article in a single operation concurrent with opening the blowing mold. In another of its concepts, the invention relates to the removal of the waste flashed plaque from a blow molded article by incorporating into the mold a means for removing the plaque.

In the blow molding of objects the material to be molded often is pinched between parts of the mold to produce a closed parison giving a hollow body of plastic material that can be pressured with fluid from the inside to conform to a mold surface. Pinching the parison between these surfaces an excess of material is flashed from within the mold generally into a space contained between pieces of the mold. Even though the pinching usually creates a tenuous line of juncture between the molded object and the flashed material a problem of removing the flashed material remains. Material can be trimmed off by a hand operation or torn off mechanically as demonstrated in U.S. 3,040,376. These operations, however, require additional handling of the molded article and the waste material after the article has been removed from the mold. Such additional handling is time consuming and expensive.

It is an object of this invention to provide an apparatus for removing the flashed waste from a blow molded object as the object is being removed from the mold.

Other aspects, concepts and objects of the invention are apparent from a study of this disclosure, the drawing and the appended claims.

SUMMARY OF THE INVENTION

According to the present invention there is provided an apparatus for removing the flashed waste from a blow molded object which comprises a blow mold, the tail waste flashing portion of which has opposing half pieces, each of said half pieces having a section extending beyond the parting line of the mold which contains an undercut of sufficient size to engage the material flashed from the blow mold. This extended portion fits an opening in the opposing mold half so that when the mold halves are closed a plaque of flashed waste material with tabular extensions forms in the flash chamber beyond the pinch off closure. As the mold halves are opened, the undercut portions of the mold engage the material flashed into the notched extensions in the flash chamber imparting a twisting motion thereto.

According to this invention a method for removing the flashed waste plaque from a blow molded object is also provided which comprises (1) compressing the flashed material into the flash chamber of the apparatus described above so that the tabular extensions are filled and (2) opening the apparatus so that the tabular extensions on the flashed material are engaged against the molding surface and a twisting motion is imparted to the flashed waste plaque which breaks this material away from the blow molded object.

In specific embodiments of this invention the extended portions of the mold can be made from the same single piece as the mold half or the extended portions can be a separate piece attached to the mold half and adapted to form a notched flash chamber in conjunction with the mold piece.

BRIEF DESCRIPTION OF THE DRAWING

Referring now to the drawing

In the drawing FIG. 1 shows a typical blow mold 11 consisting of two half molds, one of which 12, is shown in cutaway. The two mold halves close along a parting line 13 to form a mold cavity 14 within which the parison is blown. When the parison is inserted into the blow mold it is pinched together at the pinch-off line 15 to form a hollow body which is then pressured with a blowing fluid to conform to the shape of the mold. Below the pinch off line the waste material remains appended to the molded article in the compressed flashed waste slot 16.

Figure 2:
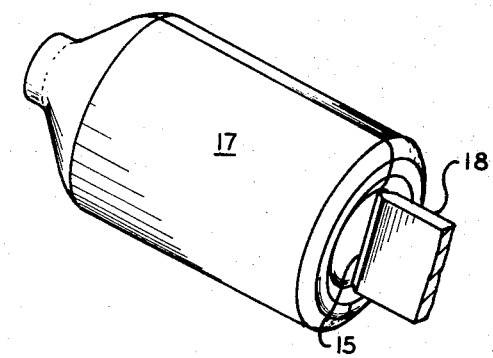
FIG. 2 shows a typical blow molded article with a tail plaque of flashed waste material.

When the blowing of the molded article is completed, the produced molded article 17 which is shown in FIG. 2 will have attached to its base a flashed waste plaque 18.

Figure 1:
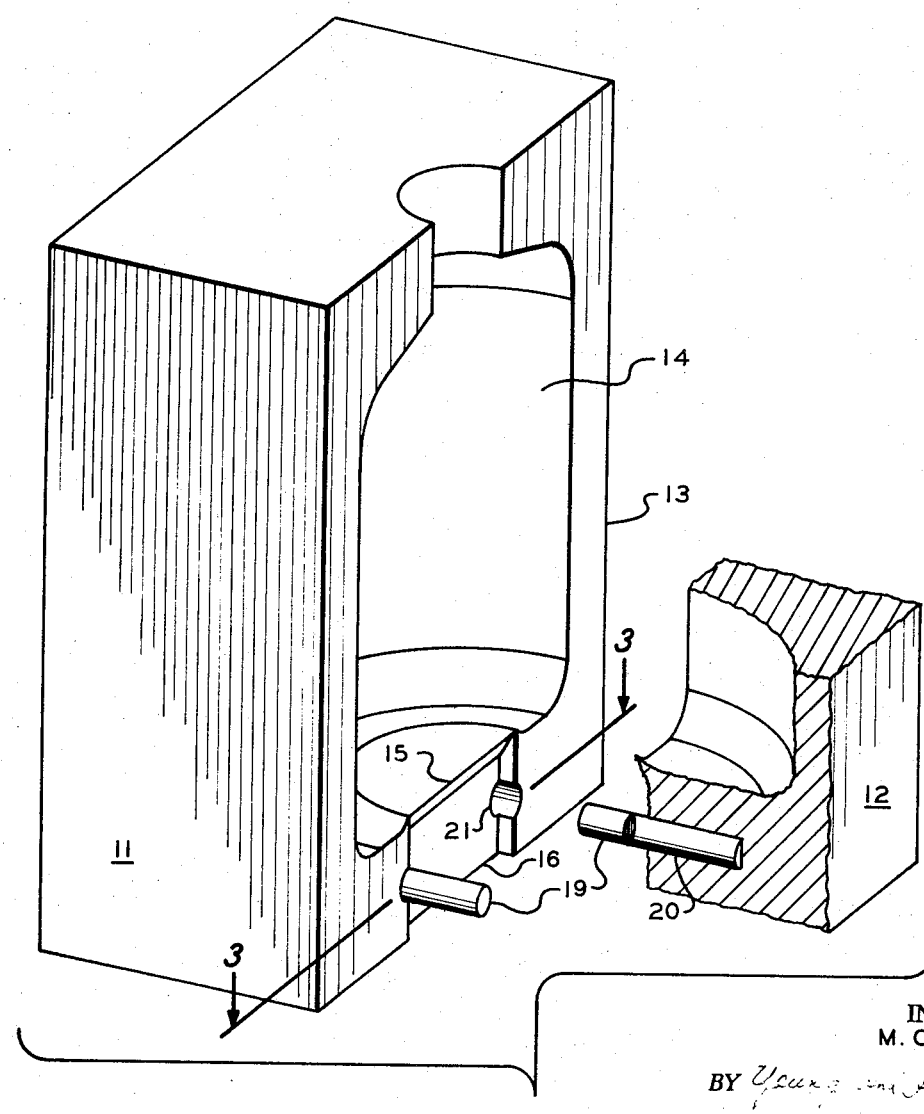
FIG. 1 shows a typical blow molding apparatus of this invention with notched dowel extensions attached to opposing faces of the mold in the waste flashing section below the parison pinch off section of the mold.

The apparatus of this invention has added to the mold as shown in FIG. 1 an extended portion 19 shown here as a dowel attached into the mold at 20 and fitting into the opposed mold face at 21 with ample open space to prevent the dowel from sticking in the opposed mold face.

Figure 3:
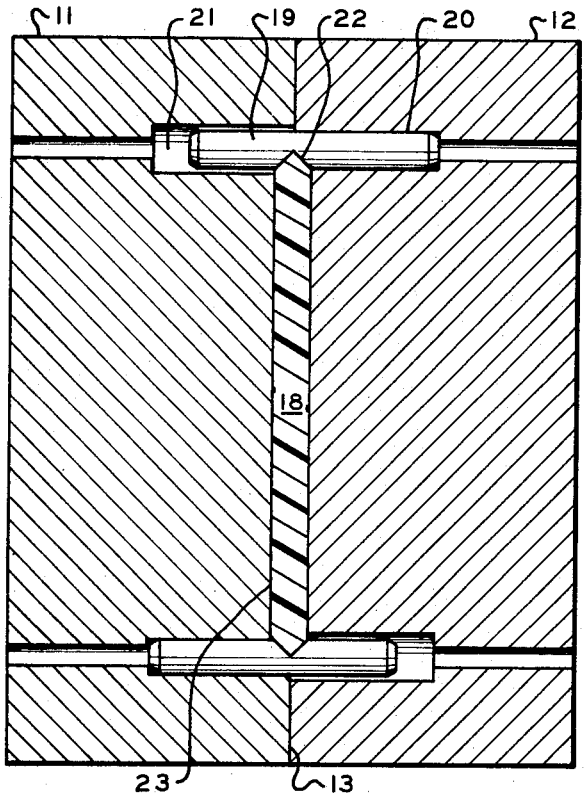
FIG. 3 shows in the closed mold position a view of section 3—3 FIG. 1 with a notched dowel attachment to the mold.

As is shown in FIG. 3, a sectional view of FIG. 1, mold halves 11 and 12 are closed along the parting line 13. The extended portion of one mold face 19 is extended into an opening 21 in the opposed mold face so that the undercut portion 22 of the extension is aligned with the flashed waste slot 23 and the flashed material compressed into the slot forms a flashed waste plaque 18 with tabular extensions into the undercut portion of the mold extension.

Figure 4:
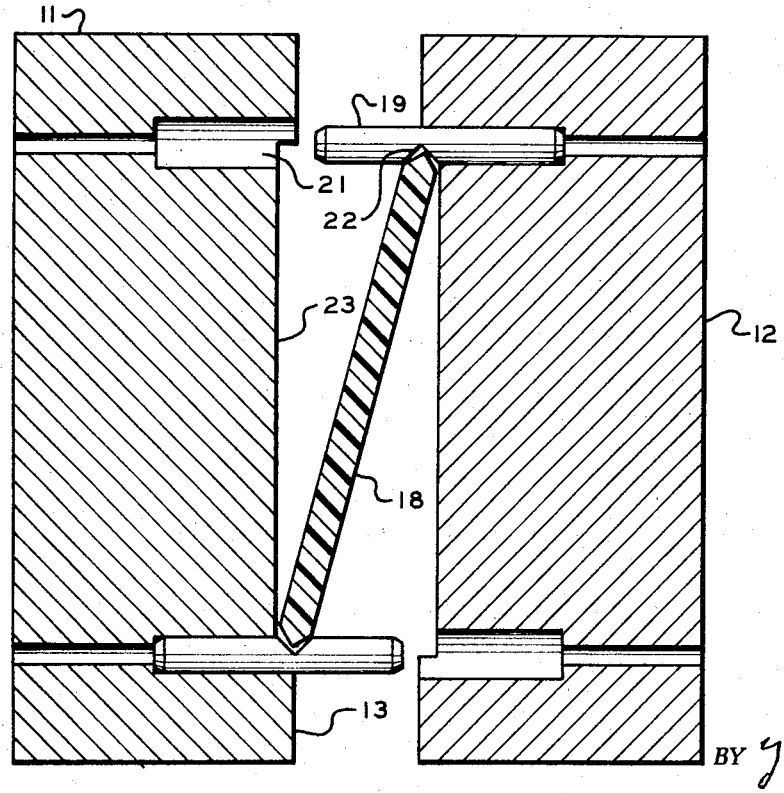
FIG. 4 shows a twisting of the flashed waste material caused by opening the mold in FIG. 3.

When the mold is opened, the mold halves 11 and 12 are moved apart. The tabbed extensions 22 are engaged in the undercut notches in which they were formed and are caused to twist as shown in FIG. 4. This twisting breaks the flashed waste plaque 18 from the molded object 17 at the pinch-off line 15.

The apparatus of this invention includes molds that open other than by moving apart in a straight line. The invention is adaptable to molds that are hinged or are moved apart with a lateral motion.

Figure 5:
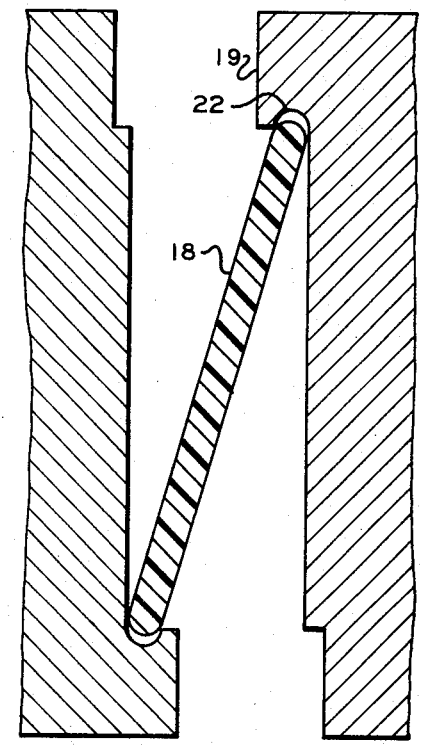
FIG. 5 shows the notched extensions of this invention built into the mold.

FIG. 5 shows another embodiment of the invention similar to that shown in cross section 3—3 of FIG. 1 in which the mold extensions 19 are made as an integral part of the mold halves 11 and 12 with the extensions undercut 22 to form the extension tab notches.

The following is a specific example showing the removal of the flashed waste plaque from a blow molded object by the method of this invention.

EXAMPLE 1

In an apparatus as shown in FIG. 1 of the drawing of this specification a plastic parison is placed extending into the mold cavity at the pinch-off line of the mold. Mold halves are brought together pinching off the parison forming a hollow body within the mold cavity and compressing the flashed waste material within the flashed waste slot so that the undercut notches in the mold extensions are filled with flashed waste material. The parison is blown to form a bottle with the flashed waste appended to its bottom. Upon opening the mold the tabular extensions of the flashed waste material are engaged in the undercut notches in which they were formed so that as the mold halves are moved apart the flashed waste material is twisted and broken away from the blow molded bottle at the pinch-off line.

Reasonable variation and modification are possible within the scope of the foregoing disclosure, the drawing and the appended claims of the invention, the essence of which is that there is provided an apparatus and method by which tabbed extensions are formed on the plaque of waste material attached to a blow molded object by which tabbed waste extensions, the plaque of waste material is sufficiently engaged with the mold that opening the mold will twist the waste material to break it away from the blow molded object.

I claim:

1. An apparatus for removing the flashed waste from a blow molded object which comprises a blow mold, the flashed waste portion of which has opposing half pieces each of said half pieces having a section extending beyond the parting line which contains an undercut of sufficient size to engage material flashed from the blow mold, said extended portion fitting an opening in the opposing mold halves so that when the mold halves are closed a flash chamber with notched extensions at the lateral edges on the mold parting line is formed beyond the pinch-off closure and so that as the mold halves are opened said notched extensions engage the tabs on the material flashed into said notches imparting a twisting motion thereto which breaks said flashed waste from said blow molded object.

2. The apparatus of claim 1 wherein said undercut extended portions are integral with said half mold pieces.

3. The apparatus of claim 1 wherein said undercut extended portions are attached to a mold half adapted to accommodate said extended portions.

4. The apparatus of claim 1 wherein said mold halves are adapted to be moved apart in a manner other than in a straight line.

* * * * *